United States Patent [19]

Gautier et al.

[11] 4,364,573

[45] Dec. 21, 1982

[54] GASKET SEAL FOR A SLIDING ROD IN A GUIDE BUSH

[75] Inventors: Guy Gautier, Montfort-L'Amaury; Regis Bondiguet, Rueil Malmaison, both of France

[73] Assignee: Regie Nationale des Usines Renault, Boulogne-Billancourt, France

[21] Appl. No.: 159,306

[22] Filed: Jun. 13, 1980

[30] Foreign Application Priority Data

Jun. 27, 1979 [FR] France .................. 79 16542

[51] Int. Cl.³ .................................................. F16J 15/32
[52] U.S. Cl. ............................... 277/153; 123/90.37; 123/188 P; 277/182
[58] Field of Search ................ 277/189, 182, 134, 38, 277/153; 123/188 P, 90.37

[56] References Cited

U.S. PATENT DOCUMENTS

| | | | |
|---|---|---|---|
| 2,860,615 | 11/1958 | Mayes | 123/90.37 |
| 2,927,808 | 3/1960 | Rosenberger | 277/153 |
| 3,326,562 | 6/1967 | Deuring | 277/182 |
| 4,124,222 | 11/1978 | Leone et al. | 123/188 P |
| 4,125,265 | 11/1978 | Grzsiak | 277/189 |

FOREIGN PATENT DOCUMENTS 1261778  7/1960  France .

*Primary Examiner*—Robert I. Smith
*Attorney, Agent, or Firm*—Oblon, Fisher, Spivak, McClelland & Maier

[57] ABSTRACT

A gasket seal for the passage of a sliding rod in a guide bushing, made of plastic material and includes two serial, coaxial, staged, integral rotating sections, of which one fits over the end of the guide bushing and the second, of smaller diameter, forms a sliding seal for the sliding rod. The connection element between these two sections includes an extension of the coupling section, connected to the sliding section through a radial flange situated at the end of the sliding section, opposite the coupling section, with said connecting extension providing a certain degree of alignment flexibility between the two aforementioned sections.

1 Claim, 2 Drawing Figures

GASKET SEAL FOR A SLIDING ROD IN A GUIDE BUSH

BACKGROUND OF THE INVENTION

1. Field of the Invention

The present invention relates to a gasket seals for a sliding rod passing through a guide bushing and, more particularly, to small-size gaskets such as, inter alia, the gasket seals between valve rods and guides in internal combustion engines.

2. Description of the Prior Art

Known gasket seals between a valve rod and guide are generally constructed from plastic material and consist of two serial, coaxial, staged, rotating sections, with one fitting over the end of the valve guide and the second, of smaller diameter, forming a sliding seal for the valve rod, the two being joined together by a simple shoulder. This shape, given the small size of the gasket seal, makes the latter too rigid and does not enable it to effectively absorb any defects of concentricity which may exist between the outer diameter of the valve guide and its bore, in which the valve rod moves. These defects of concentricity thus result in abnormal wear of the gasket seal, wear which quickly becomes harmful to the sealing effect sought.

It is current practice in manufacturing to perform on the cylinder heads of internal combustion engines a reboring of the valve guides for the purpose of aligning their bore with the corresponding valve bearings on the valve seat. From this, there frequently results slight defects in concentricity between the bore and the outer diameter of the valve guides.

SUMMARY OF THE INVENTION

The object of the present invention is a gasket seal for passage of a sliding rod through a guide bushing and the invention is designed to remedy the aforementioned problems. The seal is made of plastic and consists of two homogeneous serial, coaxial, staged, rotating substantially rigid sections, of which one fits over the end of the guide bush and the second, of smaller diameter, forms a sliding seal for the sliding rod. The connecting element between these two sections is an integral extension of the coupling section, connected to the sliding section through a radial flange situated at the end of the sliding section opposite the coupling section so as to form a one-piece seal, with said connecting extension providing a certain degree of alignment flexibility between the two aforementioned sections. This gasket seal thus ensures, through a simple elastic deformation of non-bearing, rotating part, an automatic compensation, without abnormal wear, of the defects of concentricity between the outer diameter of the guide bush and the sliding rod.

According to a variant of the first embodiment, the connecting extension comprises at least one zone of reduced thickness, thereby increasing its elasticity of flexure and, according to a preferred mode of use, the means for reducing the thickness of the connecting extension consists of at least one external channel provided around the circumference of said connecting extension.

BRIEF DESCRIPTION OF THE DRAWINGS

Various other objects, features and attendant advantages of the present invention will be more fully appreciated as the same becomes better understood from the following detailed description when considered in connection with the accompanying drawing in which like reference characters designate like or corresponding parts throughout the several views, and wherein.

DETAILED DESCRIPTION OF THE PREFERRED EMBODIMENTS

Figures 1A, 1B:
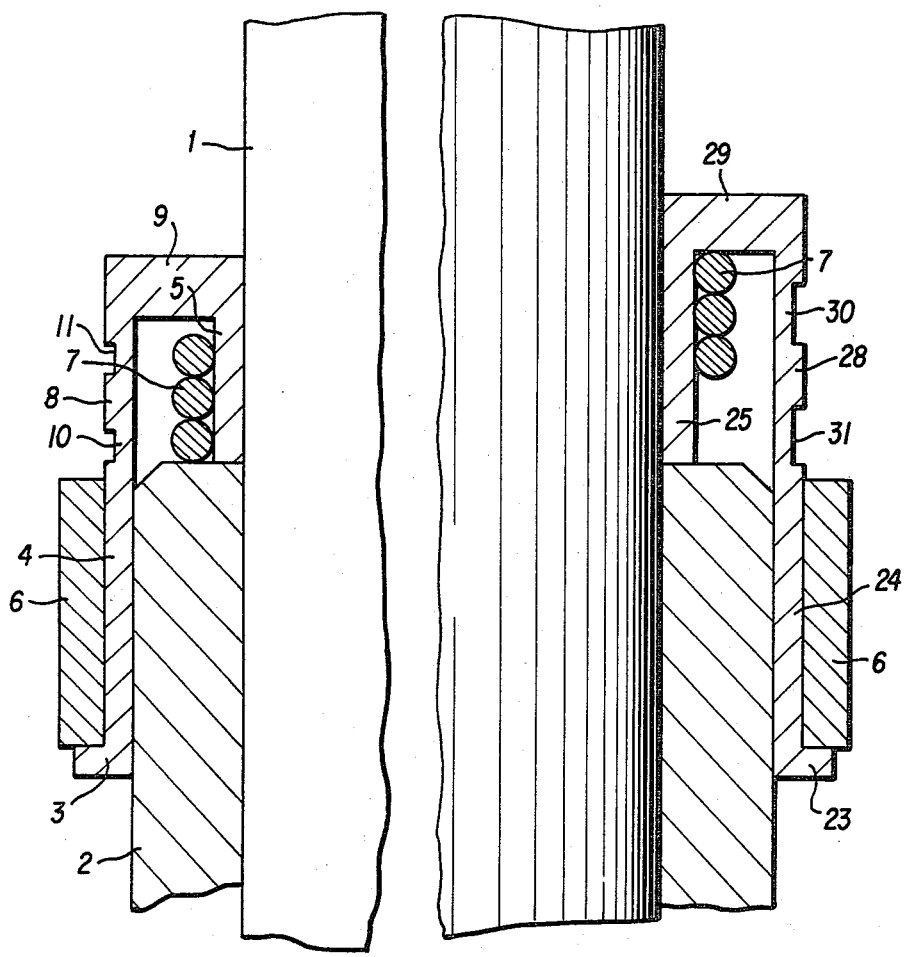
FIG. 1a and 1b are, respectively large scale cross-section of a gasket seal between valve rod and guide in an internal combustion engine and an alternative embodiment thereof.

In the preferred embodiment, sliding rod 1 is a valve rod, and guide ring 2 a valve guide, in an internal combustion engine. Gasket seals 3, 23 are as is known in the art, made of plastic material having high lubricant characteristics, such as that sold under the TEFLON brand, and each consist essentially of two serial, coaxial, staged, rotating sections, of which a first set 4, 24 fits over the end of valve guide 2, and the second set 5, 25, of smaller diameter, forms a sliding seal for valve rod 1. According to technology which is itself known, coupling sections 4, 24 are held on valve guide 2 by the pressure of a flat-leaf cylindrical spring 6, with the pressure of a solid length spiral spring 7 completing the seal between sliding sections 5, 25 and valve rod 1.

The connecting element between coupling sections 4, 24 (which fit over the valve guide 2) and sliding sections 5, 25 for valve rod 1 consists of extensions 8, 28 of coupling sections 4, 24, connected to sliding sections 5, 25 through radial flanges 9, 29, situated at the end of said sliding sections 5, 25, opposite coupling sections 4, 24. These connected extensions 8, 28, form a non-bearing, rotating part of gasket seals 3, 23, and provide, through elastic deformation (given the elastic nature of the material used), a certain degree of alignment flexibility between the coupling sections 4, 24 and the sliding sections 5, 25.

In order to increase their elasticity of flexure, connecting extensions 8, 28 further comprise zones 10, 30 of reduced thickness, formed in the present case by external channels 11, 31 provided on their circumferences.

The gasket seal thus enables, through simple and therefore reliable and inexpensive means, the defects of concentricity which may exist between the outer diameter of the valve guide and the valve rod itself to be absorbed.

The field of use of the invention is not limited to that of the gasket seal between valve rod and guide in an internal combustion engine as described above, but rather extends to any other case of sealed passage of a sliding rod through a guide bush. Similarly, various modifications may be made in the embodiment illustrated by the present example without departing thereby from the scope of the invention. Thus, in particular, gasket seal 23 shown on the right hand side of FIG. 1 has a longer sliding section which gives it, in addition to a larger sealing surface, a greater length of connecting extension 28, resulting in increased elasticity of said connecting extension 28 and thus better power of absorption of defects of concentricity by gasket seal 23 than by gasket seal 3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A homogenous gasket seal for the passage of a valve shaft through a valve guide for an internal combustion engine comprising:

first rigid seal means disposed over the outer distal end portion of said valve guide;

second rigid seal means coaxial and integral with said first seal means so as to form a one-piece homogenous seal and closely fitted around and in direct axial contact with said valve shaft for the sealing thereof, said second seal means having a radial end surface portion formed on a first axial end portion thereof and being in engaging contact with a radial end surface portion of said distal end portion of said valve guide;

flexible connecting extension means for providing alignment flexibility between said first and said second seal means and extending from a first end portion of said first seal means and having an axial length substantially equal to the axial length of said second seal means, said extension means having at least one external circumferential groove formed in an outer surface portion thereof;

a first radial flange integrally connecting a second end portion of said first seal means opposite said first end portion of said first seal means with a second axial end portion of said second seal means opposite said radial end surface portion of said second seal means such that an enclosed annular chamber is formed around said valve shaft by said first seal means, said flange, said second seal means and said radial end surface portion of said distal end portion of said valve guide;

biassing means engaging said second seal means and disposed within said annular chamber;

a cylindrical leaf spring engaging the external surface of said first seal means and substantially surrounding said distal end portion of said valve guide; and a second radial flange formed on a second end portion of said first seal means opposite said first end portion of said first seal means and in engaging contact with said leaf spring.

* * * * *